E. T. McKAIG.
LOCKING DEVICE FOR DIFFERENTIAL GEAR
APPLICATION FILED JUNE 13, 1910.

1,308,290.

Patented July 1, 1919.
2 SHEETS—SHEET 1.

Inventor:
Eddy T. McKaig,
by Walter E. Lombard,
Atty.

E. T. McKAIG.
LOCKING DEVICE FOR DIFFERENTIAL GEARS.
APPLICATION FILED JUNE 13, 1918.

1,308,290.

Patented July 1, 1919.
2 SHEETS—SHEET 2.

Inventor:
Eddy T. McKaig,
by Walter E. Lombard,
Atty.

UNITED STATES PATENT OFFICE.

EDDY T. McKAIG, OF WAUKEGAN, ILLINOIS.

LOCKING DEVICE FOR DIFFERENTIAL GEARS.

1,308,290.  Specification of Letters Patent.  Patented July 1, 1919.

Application filed June 13, 1918. Serial No. 241,073.

*To all whom it may concern:*

Be it known that I, EDDY T. McKAIG, a citizen of the United States of America, and a resident of Waukegan, county of Lake, State of Illinois, have invented certain new and useful Improvements in Locking Devices for Differential Gears, of which the following is a specification.

This invention relates to locking devices for differential gearing for driving shafts of automobiles, tractors and similar vehicles and its object is to provide a new and improved locking device for said differential gearing, to neutralize the differential action of the gearing whenever it is desired to drive the said shafts in unison, to prevent one axle section from spinning around loosely, while the other meets an obstruction and retards its turning.

The invention consists in providing one of the differential gears with a plurality of notches adapted under abnormal conditions to receive a cam controlled sliding locking bolt and thereby insure the rotation of the differential gears in unison.

The invention further consists in certain novel features of construction and arrangement of parts which will be fully understood by reference to the description of the drawings and to the claims hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and that the invention is not limited to the precise arrangement and organization of these instrumentalities as herein shown and described, except as required by the scope of the appended claims.

Of the drawings.

Similar characters designate like parts throughout the several figures of the drawings.

Figure 1:
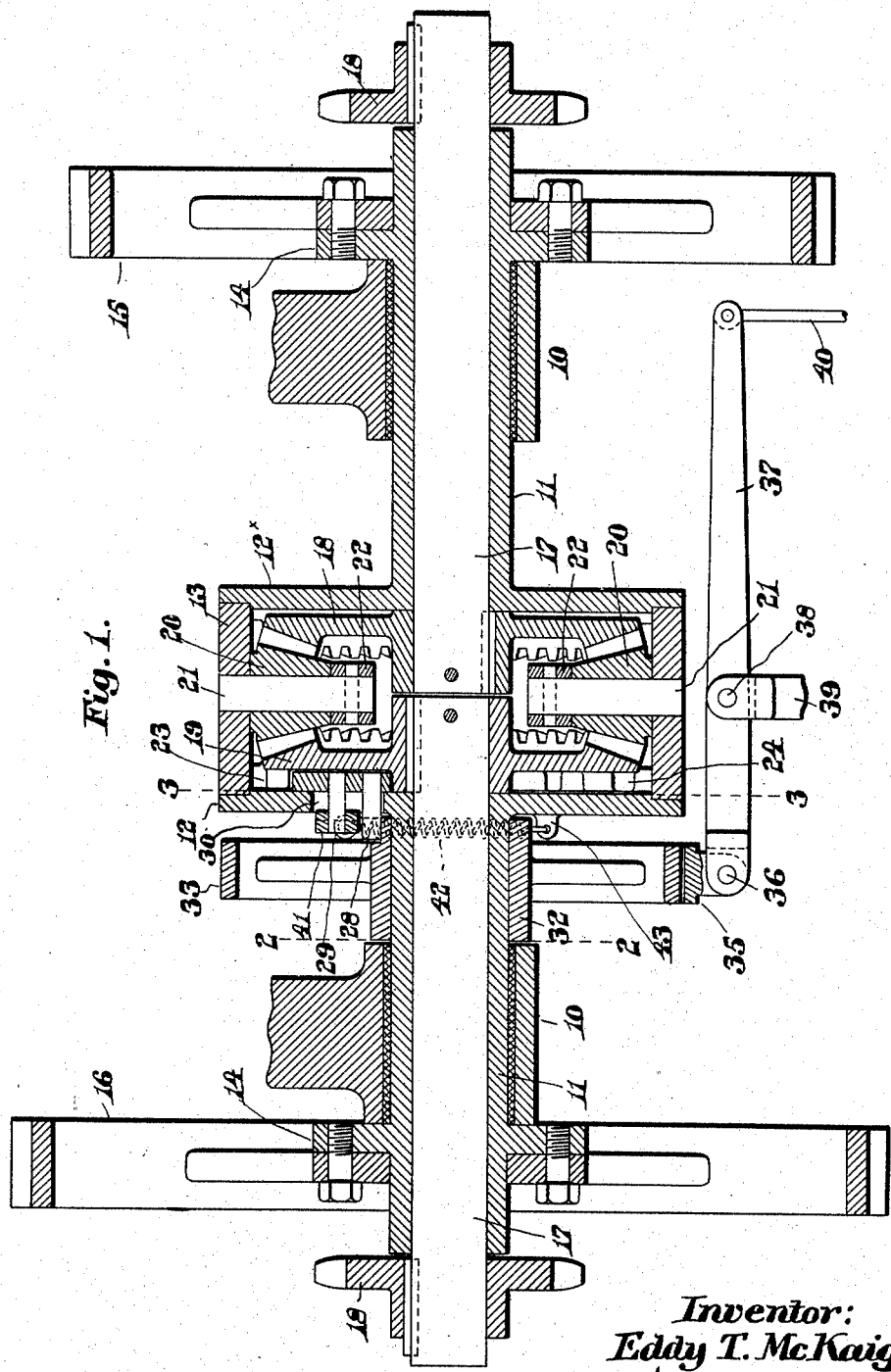
Figure 1 represents a longitudinal section of an axle driving mechanism embodying the principle of the present invention.
Figure 2:
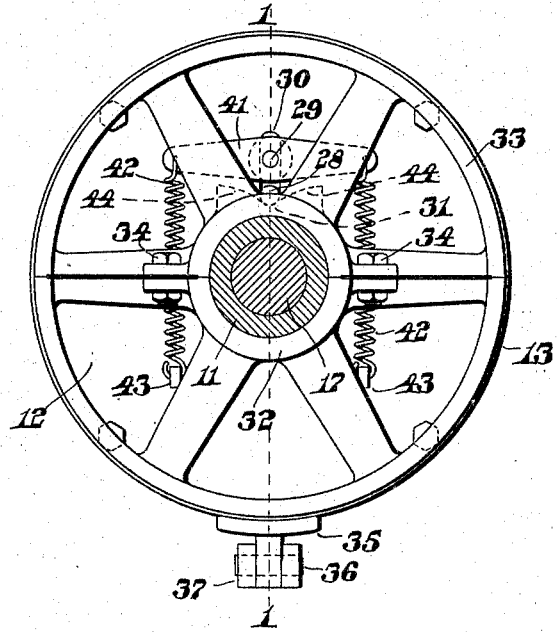
Fig. 2 represents a transverse section of the same, on line 2, 2 on Fig. 1.
Figure 3:
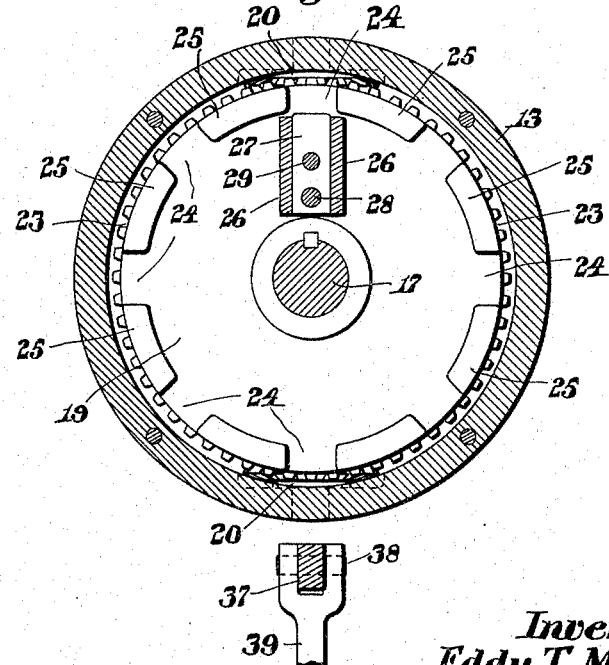
Fig. 3 represents a transverse section of the same on line 3, 3 on Fig. 1.

In the drawings, 10—10 are two bearings in which are revolubly mounted hubs 11—11 provided at their inner ends with disk flanges 12 and 12ˣ, the outer edges of which are secured to the opposite ends of an annular member 13.

Near the outer ends of the hubs 11—11 said hubs are provided with peripheral flanges 14—14 to the outer faces of which are secured gears 15 and 16, the latter gear being larger than the former, as indicated in Fig. 1 of the drawings.

The gear 15 is adapted to rotate at a high speed the hubs 11—11 and the casing formed by means of the disks 12—12ˣ and the annular member 13, while said hubs and the casing are adapted to be rotated at a low speed by means of the gear 16.

Within each hub 11 is a shaft 17, to the outer end of each of which is secured a sprocket wheel 18; these sprocket wheels 18—18 being adapted to impart motion to the driving wheels of the vehicle through the medium of the usual sprocket chains.

To the inner ends of the axle shafts 17 are secured bevel gears 18 and 19 within the casing 12, 12ˣ and 13, said gears 18 and 19 both being adapted to mesh with the bevel pinions 20 revolubly mounted upon the studs 21 extending inwardly from the annular member 13 and diametrically disposed relatively to each other. The inner end of each of the studs 21 has a collar 22 secured thereto to prevent the displacement of the pinions 20 on said studs.

The gear 19 has projecting from its rear face an annular flange 23 having a plurality of spaced notches 24 formed therein said notches dividing said flange into a plurality of projections 25.

The disk 12 has on its inner face two parallel projections 26, between which is positioned the slidable locking bolt 27 having a projection 28 and a pin 29 extending outwardly therefrom through a radial slot 30 formed in said disk 12.

The projection 28 is preferably cylindrical and normally rests in a notch 31 formed in the hub 32 of a brake drum 33.

This brake drum 33 is preferably formed in two parts secured together by the bolts 34, and is revolubly mounted upon one of the hubs 11.

Under normal conditions there is sufficient friction between the bore of the hub 32 and the periphery of the hub 11 to cause the drum 33 to rotate with said hub, but when the brake is applied to said drum the further rotation of the drum 33 with the hub 11 is prevented. This braking is accomplished by means of the shoe 35 pivotally mounted at 36 in an end of a lever 37, pivoted at 38 to a stationary support 39 and provided at its opposite end with an operating rod 40 by which the operator may move said lever 37 about its pivot 38 to force the shoe 35 against the periphery of the drum 33 thereby preventing further rotation thereof.

To the pin 29 is secured an arm 41 to the outer ends of which are secured one end of the springs 42, the opposite ends of which are secured to members 43 projecting from the outer face of a disk 12.

These springs 42 normally retain the bolt projection 28 in the bottom of the notch 31. On either side of the notch 31 the hub 32 of the drum 33 is provided with outwardly extending cam faces 44 which, when moved relatively to said projection 28, are adapted to force the bolt 27 outwardly in a radial direction into one of the notches 24 between the spaced projections 25 forming the flange 23 on the gear 19.

This movement of the sliding bolt 27 will lock the gear 19 to the disk 12 and thereby cause the two shafts 17 to rotate in unison.

This locking of the gear 19 to the disk 12 will take place whenever the shoe 35 is applied to the drum to prevent its further rotation with the hub 11 on which it is mounted.

It is obvious that inasmuch as the notch 31 is located midway between the two cam faces 44 the locking of the gear 19 to the disk 12 may be effected during the rotation of the hub 11 in either direction.

Normally the bolt 27 is disengaged from the notches 24 and the shafts 17 may be driven through the various instrumentalities mentioned either by the high speed gear 18 or the low speed gear 16.

When one of the driving wheels meets an obstruction or for any other reason is retarded from turning, the other wheel on account of the differential gearing, is permitted to rotate at a different speed.

It is often desirable, however, to neutralize the differential action and to insure the rotation of both driving wheels in unison at the same speed. This can be easily accomplished by means of the construction herein shown by the operator moving the shoe 35 into contact with the periphery of the drum 33 thus preventing further rotation thereof with the hub 11 on which it is mounted.

As soon as its rotary movement is retarded the disk 12, continuing to rotate, will cause the projection 28 to ride up on one of the cam faces 44, thus moving the bolt 27 radially into position to lock the gear 19 as previously described.

This makes a very effective construction of locking devices for differential gearing which is very simple in operation.

It is believed that the operation and many advantages of this invention will be fully understood by the foregoing description.

Having thus described my invention, I claim:

1. In a device of the class described, two alined shafts; a driving member on each shaft; a casing loosely mounted on said shafts and having outwardly extending hubs surrounding the inner ends of said shafts; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; and means controlled by said drum for locking one of said gears to said casing.

2. In a device of the class described, two alined shafts; a driving member on each shaft; a casing loosely mounted on said shafts and having outwardly extending hubs surrounding the inner ends of said shafts; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; a cam on said drum; a plurality of spaced projections on one of said gears; and a locking bolt adapted to be moved between two of said projections by said cam.

3. In a device of the class described, two alined shafts; a driving member on each shaft; a casing loosely mounted on said shafts and having outwardly extending hubs surrounding the inner ends of said shafts; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; a cam on said drum; a plurality of spaced projections on one of said gears; and a locking bolt having a projection therefrom in engagement with said cam.

4. In a device of the class described, two alined shafts; a driving member on each shaft; a casing loosely mounted on said shafts and having outwardly extending hubs surrounding the inner ends of said shafts, said casing having a slot therein; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; a cam movable with said drum; a plurality of spaced projections on one of said gears; and a locking bolt having a projection therefrom extending through said slot in said casing and adapted to engage with said cam.

5. In a device of the class described, two alined shafts; a driving member on each shaft; a casing loosely mounted on said shafts and having outwardly extending hubs surrounding the inner ends of said shafts, said casing having a slot therein; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; a cam movable with said drum; a plurality of spaced projections on one of said gears; a locking bolt having a projection extending through said slot adapted to be moved between two of said projections by said gear cam; and a spring for normally retaining said bolt disengaged from said projections.

6. In a device of the class described, two alined shafts; a driving member on each shaft; a casing loosely mounted on said shafts and having outwardly extending hubs surrounding the inner ends of said shafts, said casing having external projecting members and a slot; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; a cam movable with said drum; a plurality of spaced projections on one of said gears; a locking bolt having a projection therefrom extending through said slot in said casing and adapted to engage with said cam; a pin extending through said casing slot; an arm thereon; and springs interposed between the opposite ends of said arm and said projecting members on said casing.

7. In a device of the class described, two alined shafts; a driving member on each shaft; a casing loosely mounted on said shafts and having outwardly extending hubs surrounding the inner ends of said shaft; driving members secured to said hubs; a revoluble bevel pinion carried by said casing; a bevel gear secured to the inner end of each shaft within said casing and meshing with said pinion; a plurality of projections concentrically disposed on the back of one gear; a locking bolt within said casing adapted for insertion between two of said projections; and means for controlling the operation of said bolt including a cam movable independently of said casing.

8. In a device of the class described, two alined shafts; a driving member on each shaft; a casing loosely mounted on said shafts and having outwardly extending hubs surrounding the inner ends of said shafts; bearings in which said hubs are revolubly mounted; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; and means controlled by said drum for locking one of said gears to said casing.

9. In a device of the class described, two alined shafts; a driving member on each shaft; a casing loosely mounted on said shafts and having outwardly extending hubs surrounding the inner ends of said shafts, said hubs being provided near their outer ends with peripheral flanges; gears secured to said flanges; a revoluble bevel pinion carried by said casing; a bevel gear secured to the inner end of each shaft within said casing and meshing with said pinion; a brake drum freely revoluble on one of said hubs; means for applying a brake to said drum; a cam on said drum; a plurality of spaced projections on one of said gears; and a locking bolt movable with said casing and adapted to be moved between two of said projections by said cam.

10. In a device of the class described, two alined shafts; a driving member on each shaft; a casing loosely mounted on said shafts and having outwardly extending hubs surrounding the inner ends of said shafts, said hubs being provided near their outer ends with peripheral flanges; gears mounted on said hubs and secured to said flanges; a revoluble bevel pinion carried by said casing; a bevel gear secured to the inner end of each shaft within said casing and meshing with said pinion; bearings in which said hubs are revolubly mounted with their flanges abutting the outer ends thereof; a brake drum freely revoluble on one of said hubs; means for applying a brake to said drum; a cam on said drum; a plurality of spaced projections on one of said gears; a locking bolt; and a projection therefrom in engagement with said cam.

11. In a device of the class described, two alined shafts; a driving member on each shaft; a casing loosely mounted on said shafts and having outwardly extending hubs surrounding the inner ends of said shafts, said casing having a slot therein; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; a cam movable with said drum; an annular flange on one of said gears having a plurality of radial notches therein; and a locking bolt adapted to be moved into one of said notches and having a projection therefrom extending through said slot in said casing and adapted to engage with said cam.

12. In a device of the class described, two alined shafts; a driving member on each shaft; a casing loosely mounted on said shafts and having outwardly extending hubs surrounding the inner ends of said shafts; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; a cam movable with said drum; an annular flange having a plurality of radial notches therein extending from one of said gears; a locking bolt adapted to be moved into one of said notches by said cam; and a spring for normally retaining said bolt disengaged from said notches.

13. In a device of the class described, two alined shafts; a driving member on each shaft; a casing loosely mounted on said shafts and having outwardly extending hubs surrounding the inner ends of said shafts, said casing having a slot therein; gears secured to said hubs; a revoluble bevel pinion carried by said casing; a bevel gear secured to the inner end of each shaft within said casing and meshing with said pinion; a brake drum freely revoluble on one of said hubs; means for applying a brake to said drum; a cam on said drum; a plurality of spaced radial notches on one of said gears; a locking bolt adapted to be moved into one of said notches and having a projection therefrom extending through said slot in said casing and adapted to engage with said cam; a pin extending through said casing slot; an arm thereon; and springs interposed between the opposite ends of said arm and projecting members on said casing.

14. In a device of the class described, two alined shafts; a driving member on each shaft; a casing loosely mounted on said shafts and having outwardly extending hubs surrounding the inner ends of said shaft, said casing having a radial slot; driving members secured to said hubs; a revoluble bevel pinion carried by said casing; a bevel gear secured to the inner end of each shaft within said casing and meshing with said pinion; a plurality of radial notches concentrically disposed on the back of one gear; a locking bolt within said casing adapted for insertion into either of said notches and provided with a projection extending through said radial slot in said casing; and a cam carried by said drum and coacting with said bolt projection for controlling the operation of said bolt, said cam having operating faces extending in opposite directions from a central point.

15. In a device of the class described, two alined shafts; a driving member on each shaft; a casing loosely mounted on said shafts and having outwardly extending hubs surrounding the inner ends of said shafts; driving members secured to said hubs; a revoluble bevel pinion carried by said casing; a bevel gear secured to the inner end of each shaft within said casing and meshing with said pinion; a plurality of radial notches concentrically disposed on the back of one gear; a locking bolt within said casing adapted for insertion in either of said notches; a brake drum freely revoluble on one of said hubs; a pivoted lever provided with a shoe for engaging said drum; and means controlling the operation of said bolt including a cam movable with said drum.

16. In a device of the class described, two alined shafts; a sprocket wheel on each shaft; a differential gearing interposed between said shafts including an intermediate pinion; a casing inclosing said differential gearing and carrying said pinion, said casing having alined hubs surrounding said shafts; bearings in which said hubs are revolubly mounted; a driving gear on each hub; a brake drum loosely mounted on one hub but normally revoluble therewith; means actuated by said drum for locking said differential gearing; and means under the control of the operator for applying a brake to said drum.

17. In a device of the class described, two alined shafts; a sprocket wheel on each shaft; a differential gearing interposed between said shafts including an intermediate pinion; a casing inclosing said differential gearing and carryng said pinion, said casing having alined hubs surrounding said shafts; bearings in which said hubs are revolubly mounted; a driving gear on each hub, said gears being of different diameters; a brake drum loosely mounted on one hub but normally revoluble therewith; means actuated by said drum for locking said differential gearing; and means under the control of the operator for applying a brake to said drum.

Signed by me at Waukegan, county of Lake, State of Illinois this 6th day of December, 1917.

EDDY T. McKAIG.

Witnesses:
ELIZABETH A. MAGUIRE,
NATHAN C. LOMBARD.